May 29, 1928.
H. C. FANDREY
PLOW HITCH
Filed July 23, 1927
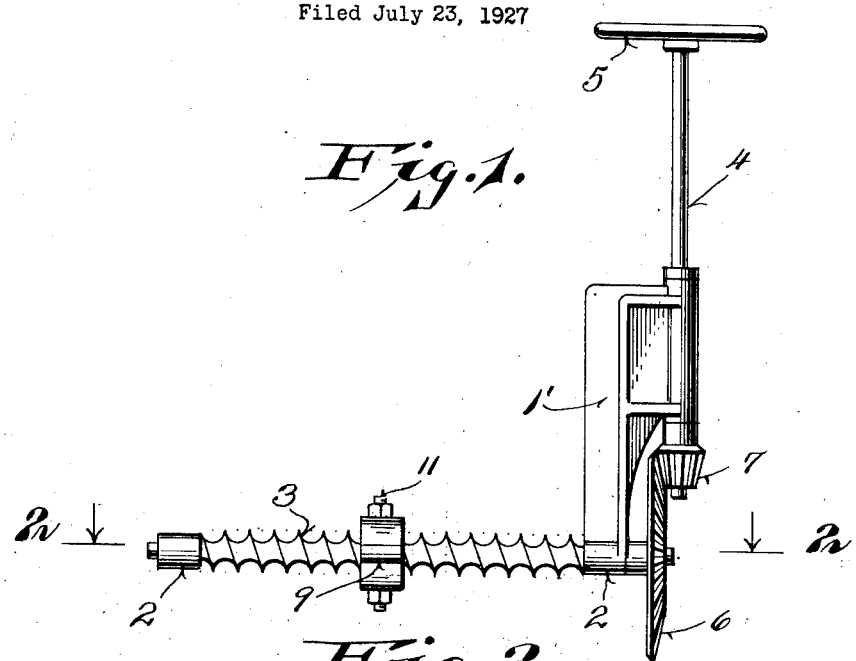
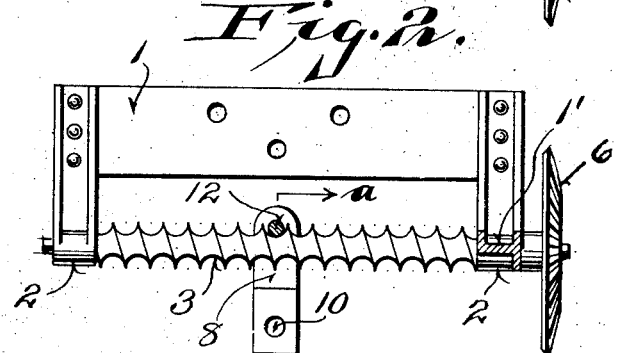
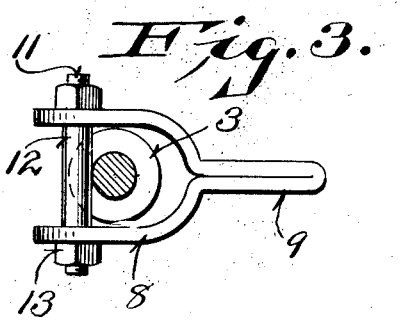
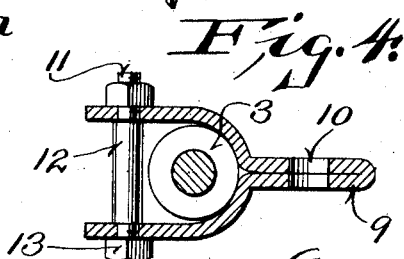
Inventor
Hugo C. Fandrey Patented May 29, 1928.

1,671,632

UNITED STATES PATENT OFFICE.

HUGO C. FANDREY, OF EMBARRASS, WISCONSIN.

PLOW HITCH.

Application filed July 23, 1927. Serial No. 207,892.

This invention relates to plow hitches, and is particularly directed to a construction adapted for use on tractors and similar vehicles used for drawing agricultural implements across a field.

Objects of this invention are to provide a novel form of construction in which the drawbar attachment of the implement is so made that its point of attachment to the tractor may be shifted laterally of the tractor while the tractor is in actual motion and by the operator without requiring him to leave his seat.

Further objects are to provide a very simple and sturdy type of device which is eminently practical and is easy to operate and which has a minimum number of parts.

A further object of this invention is to provide a novel form of hitch which may be adjusted to the exact position while the tractor is in use, as stated above, and which also when the device is unloaded, may be quickly manually adjusted by bodily shifting the clevis by hand, laterally of the adjusting member.

An embodiment of the invention is shown in the accompanying drawings in which:

Figure 1 is an elevation of the device;

Figure 2 is a sectional view on the line 2—2 of Figure 1;

Figure 3 is a sectional view on the line 3—3 of Figure 2, with the clevis shown in full;

Figure 4 is a corresponding sectional view showing the clevis in another position adapted for quick manual adjustment.

Referring to the drawings, it will be seen that the device comprises a frame 1 which is adapted for attachment to the rear of the tractor. This frame is provided with a pair of rear bearings 2 which carry the ends of a transverse adjusting worm 3. From Figure 1, it will be seen that an auxiliary frame 1' extends vertically upwardly from the main frame and has an elongated bearing for the hand wheel shaft 4, such shaft being provided with a crank or hand wheel 5 at its upper end. The worm and the shaft 4 are connected by means of a relatively large bevel gear 6 carried by the worm shaft and a small bevel pinion 7 carried by the hand wheel shaft, as shown in Figure 1.

A clevis or travelling cross head 8 is provided and loosely surrounds the worm 3. It is a forked device having a tongue 9 provided with an aperture 10 (see Figure 4) adapted to be attached to the plow or other implement. The rear ends of the fork 8 are joined by means of a transverse bolt 11. If desired, this bolt may be either shouldered or provided with a spacer. At all events, the relatively large central part 12 of the bolt holds the arms spaced apart, although the bolt is tightly clamped in place by means of the nuts 13. The bolt contacts with the screw 3 and fits within the threads of this screw or worm. It is to be noted that the threads are not V threads but instead have a rounded contour, thus accommodating the bolt and permitting swinging action of the clevis about the axis of the bolt without any undue wear upon the worm and without any binding whatsoever.

It is apparent from the construction described and illustrated that while the tractor is in motion the point of attachment of the implement may be varied by rotating the hand wheel, thus causing the cross head or clevis to travel transversely of the tractor and consequently varying the point of attachment of the drawn implement.

It is also apparent that when the device is unloaded that the clevis may be manually shifted laterally by first pushing it rearwardly into the position shown in Figure 4, and then moving it laterally. This provides for a quick rough adjustment which may be subsequently varied while the device is loaded, and in operation by rotating the hand wheel.

It will be seen therefore that a very simple type of drawbar coupling has been provided which may be either quickly manually shifted or may be accurately adjusted while the device is in actual operation.

Although the invention has been described in considerable detail, such description is intended as illustrative rather than limiting as the invention may be variously embodied and as the scope of such invention is to be determined as claimed.

I claim:

A drawbar attachment for tractors comprising a frame adapted for attachment to a tractor, a transverse worm carried by said frame, manual means for rotating said worm, a forked clevis spanning said worm and adapted for attachment to the drawbar of a trailing implement, a transverse member carried by the forked arms of said clevis and normally bearing against the forward side of said worm, said forked arms and transverse member providing a space therebetween of greater dimensions than the diameter of said worm, whereby said clevis may be manually laterally shifted without rotating said worm when said device is unloaded.

In testimony that I claim the foregoing I have hereunto set my hand at Embarrass, in the county of Waupaca and State of Wisconsin.

HUGO C. FANDREY.